United States Patent
Harter et al.

(10) Patent No.: US 6,212,564 B1
(45) Date of Patent: Apr. 3, 2001

(54) DISTRIBUTED APPLICATION LAUNCHER FOR OPTIMIZING DESKTOPS BASED ON CLIENT CHARACTERISTICS INFORMATION

(75) Inventors: John L. Harter, Cary; David Bruce Lection, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,813

(22) Filed: Jul. 1, 1998

(51) Int. Cl.[7] .................................................. G06F 17/30
(52) U.S. Cl. .......................... 709/228; 709/227; 709/246; 707/526; 707/546
(58) Field of Search .................................. 707/103, 526, 707/542; 709/246, 227, 228; 713/200

(56) References Cited

U.S. PATENT DOCUMENTS

| | | | | |
|---|---|---|---|---|
| 5,907,324 | * | 5/1999 | Larson et al. ...................... | 345/330 |
| 5,908,469 | * | 6/1999 | Botz et al. ......................... | 713/201 |
| 5,928,323 | * | 7/1999 | Gosling et al. .................... | 709/203 |
| 5,983,267 | * | 11/1999 | Shklar et al. ...................... | 709/217 |
| 6,012,098 | * | 1/2000 | Bayeh et al. ...................... | 709/246 |
| 6,044,465 | * | 3/2000 | Dutcher ............................. | 713/200 |

* cited by examiner

Primary Examiner—Thomas G. Black
Assistant Examiner—William Trinh
(74) Attorney, Agent, or Firm—Jeanine S. Ray-Yarletts

(57) ABSTRACT

A method, system and program product are described which allow a dynamically constructed desktop to be optimized for the capabilities of the browser in the target device. This enables a server to manage the distribution of applets to clients matching the capabilities of the browser, the Java runtime environment (JRE), the screen resolution, color depth, sound capabilities, link speed, communications links and any other items which can be differentiated that are supported by the client requesting use of the applet.

7 Claims, 6 Drawing Sheets

DISTRIBUTED APPLICATION LAUNCHER FOR OPTIMIZING DESKTOPS BASED ON CLIENT CHARACTERISTICS INFORMATION

BACKGROUND OF THE INVENTION

Computers have become pervasive in everyday life for many people. Computers are commonplace in the office and at home. Some people have hand-held computer devices to carry names and addresses with them, which connect to their notebook computer which they take to meetings and use when traveling, which also connect to their desktop unit for office or home use. The larger and more powerful computers usually are associated with physically larger units which are difficult for individuals to carry with them. This has resulted in several sizes of computers each having their own special purpose.

Users of computers become comfortable with applications and desire those applications to be portable across all of the machines which they use. A user of an address book on a small hand held device would also like to access that same address book on their office computer. They would rather not be required to learn a completely different address book. This is not so much a problem when the application is designed for the smallest computer, but it does become a problem when the application is designed for one of the larger, more robust units and the user wishes to execute the application on the smaller unit.

The ability to execute applications not specifically designed for a plurality of systems has exploded with the rapid acceptance of Java®[1] in the computing industry. Using Java, a computer user can download applications written in Java to their machine for execution. The user can request the execution of the application on their desktop system having extensive functionality as well as requesting the execution of the same application on a network computer having minimal functionality. This causes problems for robust applications.

Java is a registered trademark of Sun Microsystems, Inc.

Several application designers have implemented license management applications wherein an application queries the server to ensure that the user is allowed to access the application which they desire to download for execution. In the design of these applications, the user's application data is typically stored on the server so that the user can access the application and data from any computer which they chose to logon to. The design of most of these products is vertical in nature, the system is designed for a specific subset of client devices rather than for all possible clients. This is partially due to the complexity and differences in capabilities across a broad range of devices. Even though most of the popular target devices have Java enabled HTML (hypertext mark-up language) browsers, the difference in function, bandwidth to the device and capability with these devices can vary widely therefore most solutions are limited to a subset of devices.

A need exists for a means of mitigating the functional differences between the different levels of computers with little or no impact to the end user. This would allow applications to be utilized on a wider range of devices. This is easier to understand through example. Take a 3270 emulator, for example. There could be three versions of an emulator named PC13270 available, a full function and fully enhanced graphical user interface version, a medium function and medium user interface version and a small function version. Each one is the same application to the user and has the same name to the user. The Applet Launcher link to the PC/3270 references the specific one based on the capabilities of the device which is acquiring access. A small wireless unit might only be capable of executing the small version. From the user's perspective, it is the same application, perhaps with less fringe function, but the user can count on the core function, key mapping and other application attributes. This enables a series of applications that look the same in function and are named the same to execute across multiple platforms based on the specific capabilities of the platforms.

SUMMARY OF THE INVENTION

The focal point of managed applications is the application launcher. This is the first interface that the user encounters when they start a system. From the launcher, the user selects applications and invokes them. The present invention provides a method, system and apparatus for providing a dynamic desktop construction component in a client/server based application suite. The construction component is added to the server that dynamically constructs the user's desktop based on the device from which the logon is received. This dynamically constructed desktop is optimized to provide a desktop matching the capabilities of the browser in the device, the capabilities of the Java runtime environment (JRE) in the device, the capabilities of the communication links in the device, the screen resolution and color depth of the device or any other system capabilities that the designer desires to optimize the application for. In addition, if the desktop is generated in HTML, it will allow the browser to query (via HTTP GET url HEAD) the page representing the desktop and the browser will automatically download the latest desktop when a new desktop becomes available.

DETAILED DESCRIPTION OF THE PREFERRED EMBODIMENT

The present invention will now be discussed in greater detail with reference to the attached figures and a preferred embodiment. The embodiment of the present invention may be implemented in software or as a combination of hardware and software such as smart cards. In the preferred embodiment the launcher is implemented as an applet launchers although other embodiments of the launcher are envisioned. The preferred embodiment is not meant to limit the scope of the invention in any way but only to provide a workable example.

Figure 5:
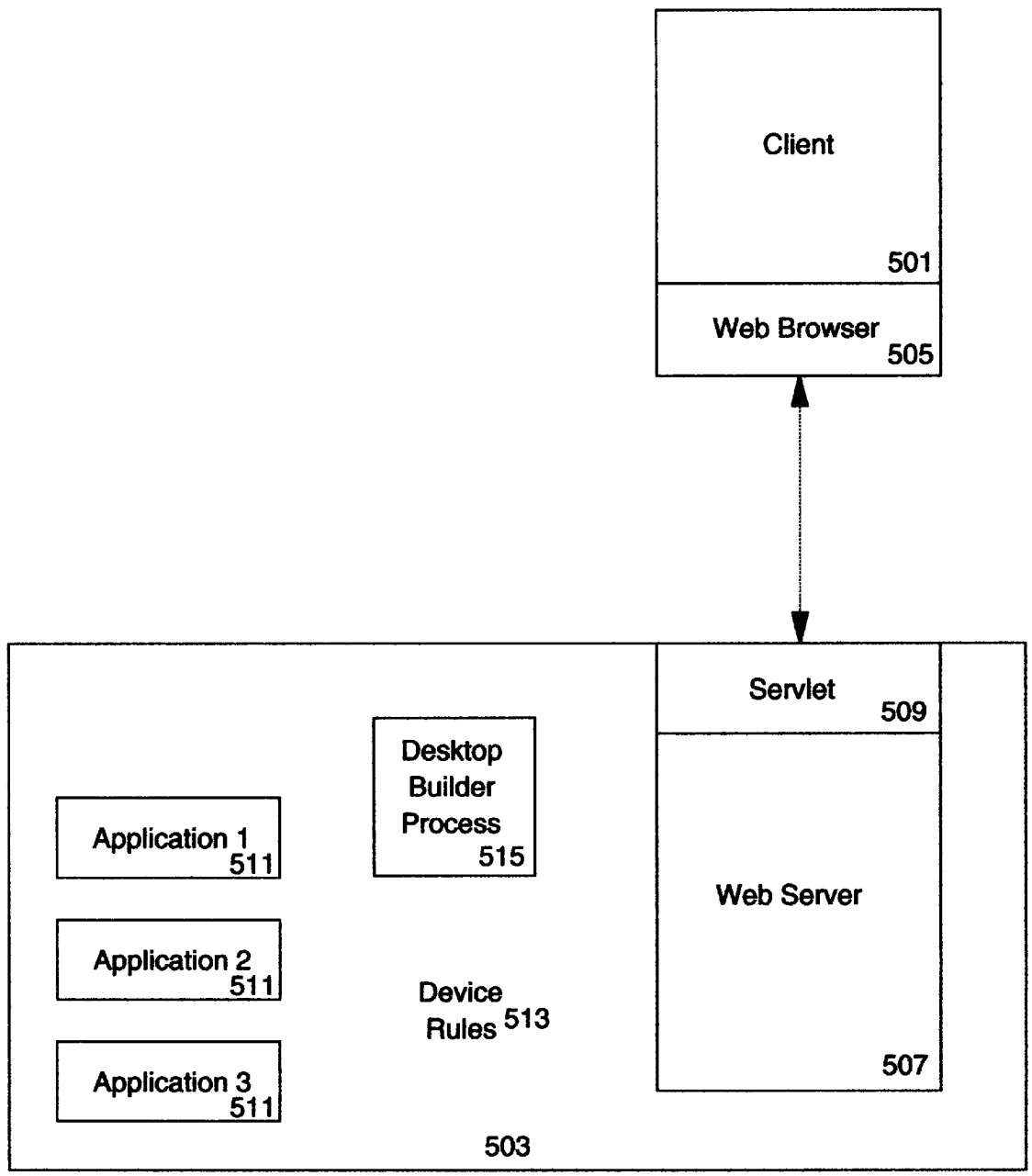
FIG. 5 is a block diagram of the components of the preferred embodiment of the present invention.

Referring to FIG. 5, the present invention implements a client process that is run on a distributed computer 501 and a server process running on a host or server computer 503. When a user requests a url (uniform resource locator) by way of a web browser 505, the browser sends a request to a web server 507. The web server of the present invention will pass the request to a servlet 509 for processing. The servlet 509 returns to the client 501, via the web server 507, the application launcher for the client based on device information passed to the servlet in the request. The servlet uses a set of rules 513 to build the optimal application launcher based on the capabilities of the client and, if desired, the network bandwidth. These capabilities of the client include, but are not limited to, the capabilities of the browser running on the client, the resolution and capabilities of the monitor and hardware executing the browser and any other information relevant to the execution of applications or applets on the client.

The present invention allows a user to invoke an instance of a product or a suite of products from one device and receive a desktop customized for that device with the associated set of applications that will run efficiently on that device and subsequently invoke the product or suite on a different device and receive a different desktop of the same set of applications that is tailored to run efficiently on the subsequent device. This gives a provider of applications or application suites the flexibility to utilize the robust features of larger, more sophisticated machines yet still support the limited functionality of smaller or less sophisticated devices. For example, a suite provider can choose to provide highly functional but larger sized Java applications to the larger, higher function machines and still deliver smaller, limited function versions of the applications written in Java or other languages such as Javascript and DHTML to a machine with less functionality and less space. The customization of these applications includes not only functionality but includes image and color definitions for the desktop, screen resolution and sound capabilities for example. The customization of the image color and depth is especially important when dealing with the differences between enhanced color screens and monochrome or gray-scale screens.

In the preferred embodiment of the present invention, a client process is utilized to enable the user to view an application launching desktop. The client process is typically written as a Java applet or as HTML (hyper-text markup language) pages. When an application is terminating it can redisplay the desktop using the showDocument( ) function which is available in HTML via Javascript or in Java applets from the showDocument( ) method in the applet class. A server process is responsible for providing the proper desktop to the client using HTTP. This can be done using standard HTTP request protocols. In the preferred embodiment, when the server process rebuilds the user's page the authoring date within the page is updated to indicate the current date and time. This causes the browser to load the page from the server rather than rereading the page from the browser's cache if the page has been updated since the time indicated on the copy in the browser's cache.

Figure 1:
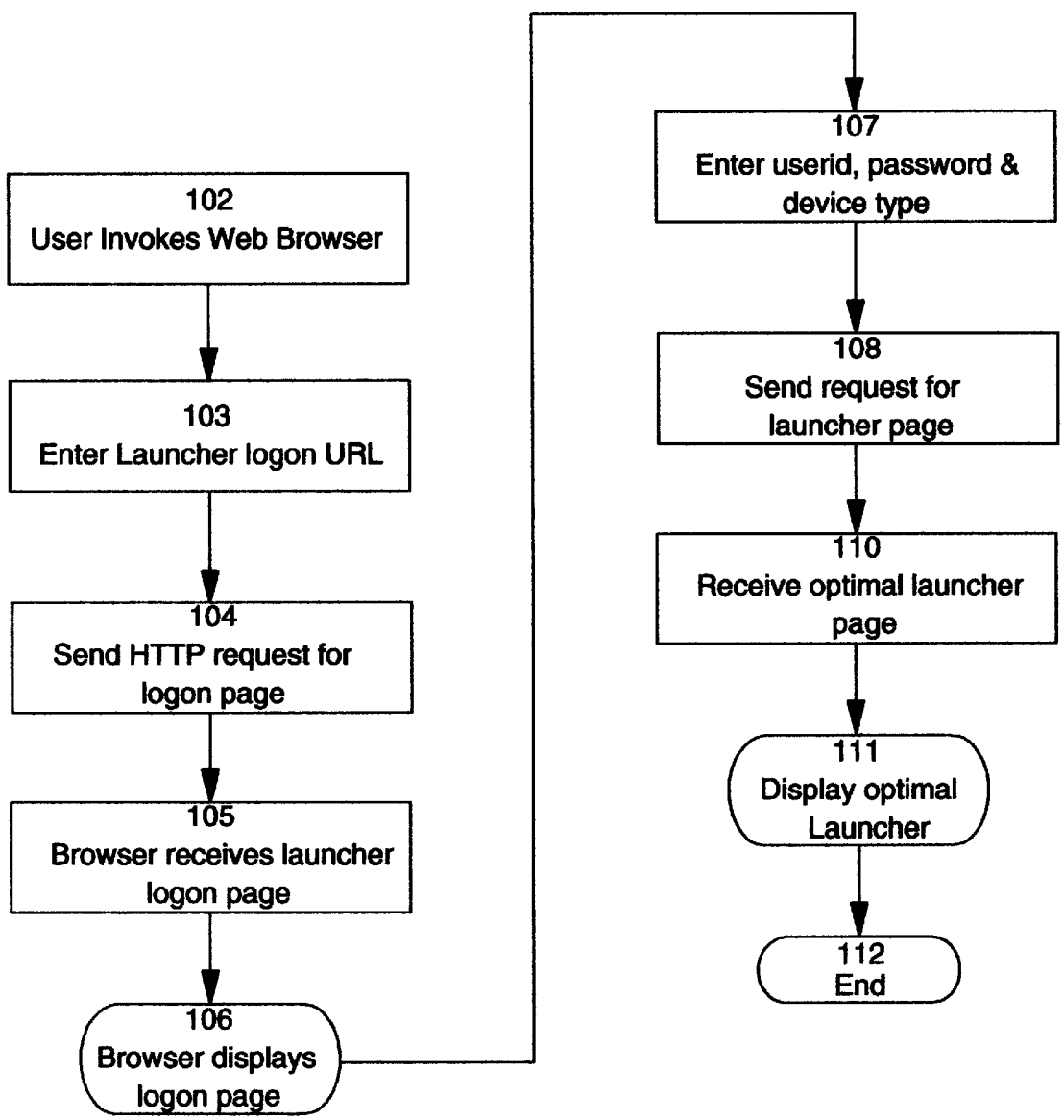
FIG. 1 is a flow chart representative of the client logic of the present invention.

Referring to the figures, FIG. 1 depicts the flow of the logic in the browser process of the preferred embodiment of the present invention. First the user invokes the web browser 102 which resides on the client. The user then issues the commands to enter the Java launcher logon page which is a URL 103. The browser then sends an HTTP request for the logon page to the server 104. The browser then waits to receive the launcher logon page from the server 105. When the browser receives the launcher logon page, it displays the page 106 on the user's display device. The user then enters a user identifier, password (if required) and a device type 107 (if not automated). Using HTTP, the browser then sends a request for an applet launcher page along with the user identifier, password and device type to the server 108. As will be obvious to one skilled in the art, several devices have the ability to provide their device type rather than querying the user. Java included in the logon page of the preferred embodiment will attempt to identify the device or prompt the user for the device if it cannot be determined programmatically. This reduces the number of errors introduced by misidentification of the system type entered manually by a user. Once the browser has sent the request for an applet launcher page, the web server receives the request and transfers the request to a dynamic desktop servlet residing on the server. The servlet retrieves/constructs the optimal launcher page and returns the page to the user's browser. The user's browser receives the optimal launcher page 110 and displays the optimal applet launcher page 111 on the display of the requesting device.

Figure 2:
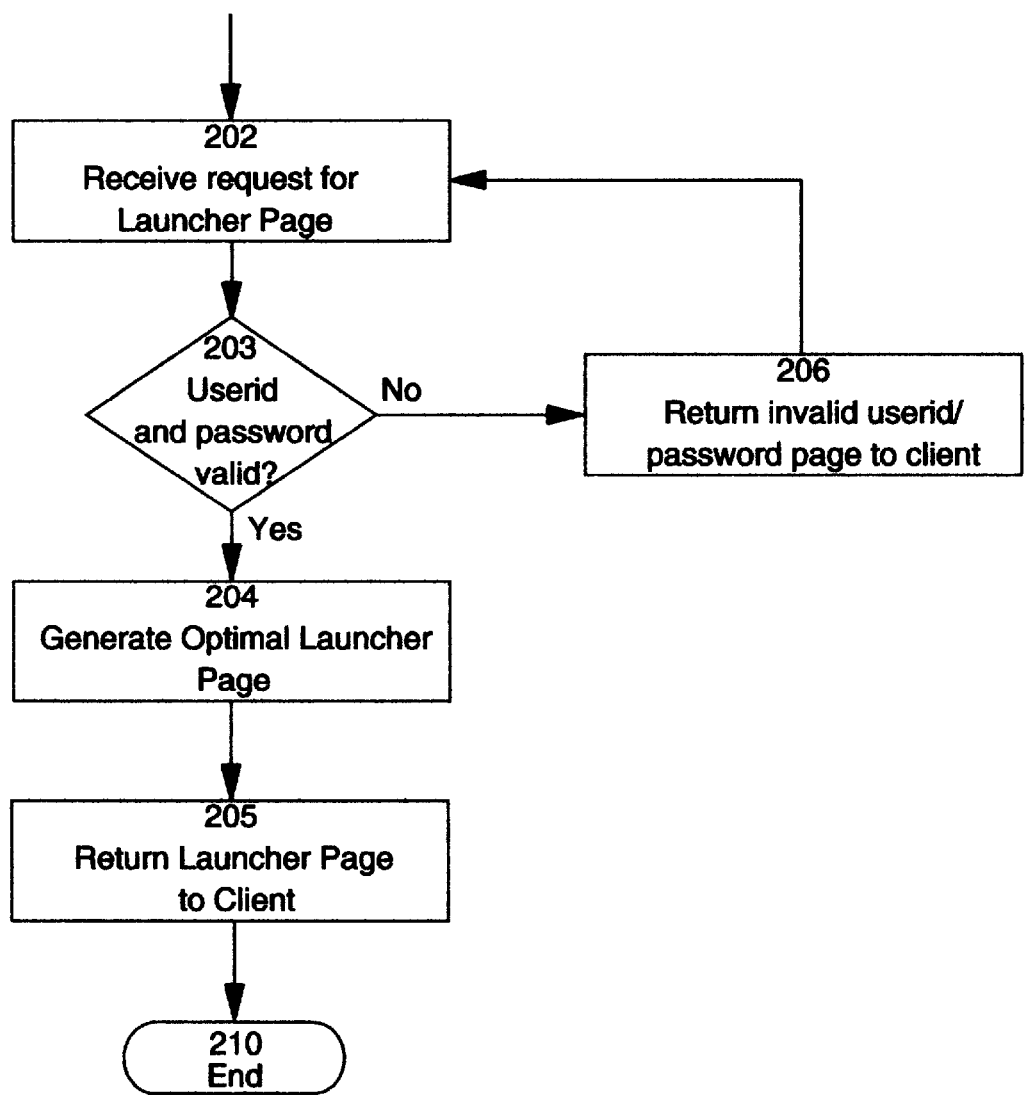
FIG. 2 is a flow chart representative of the server logic for the present invention.

FIG. 2 depicts the logic flow on the server side of the process. First a servlet running on the server receives the request for the applet launcher page based on the user identifier, password and device type 202. The servlet validates the user identifier and password 203 and if they are valid the servlet generates or selects the applet launcher HTML page which is optimal for the requested device 204. The servlet then returns the applet launcher page to the client 205.

If, at 203, it was determined that either the user identifier or password were invalid, the servlet would return an invalid user identifier/password page to the client 206. The browser on the client device would receive the page and display it. If the user were to re-enter the user identifier and password, the browser could then send the updated page to the server and the servlet would receive the request for the applet launcher page again 202.

Figure 3:
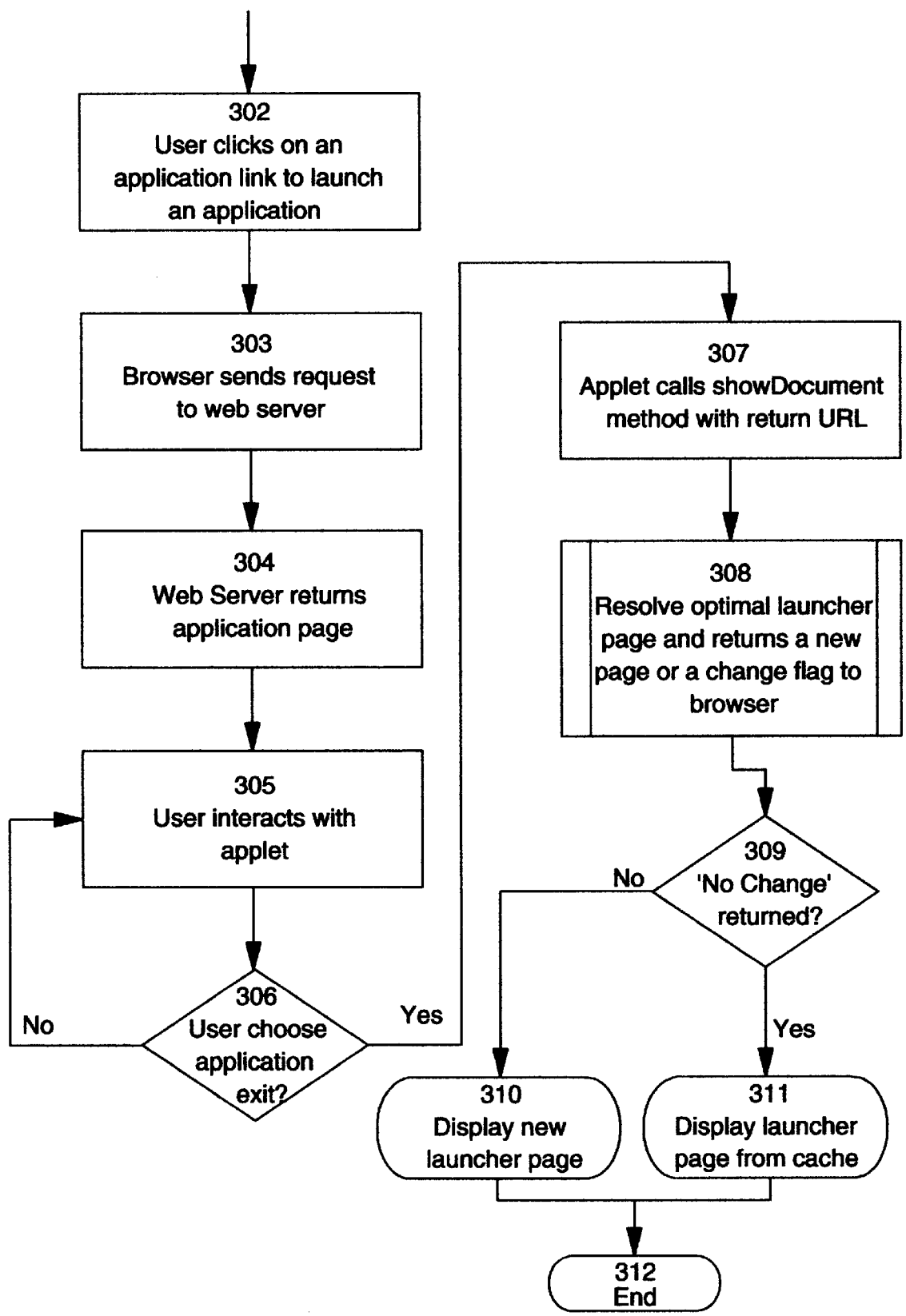
FIG. 3 is a flow chart of the communications interaction between the client and the server of the present invention.

FIG. 3 depicts the logical information flow between the browser and the server in the preferred embodiment of the present invention. First the user selects an application link to launch an application 302. The browser then, using HTTP, sends the request to the web server for the selected application 303. The web server returns an application page for the selected application to the web browser 304, the application page containing a selected Java applet. The user is then able to interact with the applet 305. The browser then waits until the user chooses to exit the selected application 306, when the user chooses to exit, the applet calls the showDocument method with the return URL 307. The servlet then resolves the optimal application launcher page and returns a new page or an HTTP HEAD tag indicating "no change" to the users browser 308. The browser checks to see if a "no change" indication has been returned 309. If it has been returned then the browser displays the applet launcher page from the browser's cache 311, otherwise the browser displays the new applet launcher page received from the servlet 310.

Figure 4:
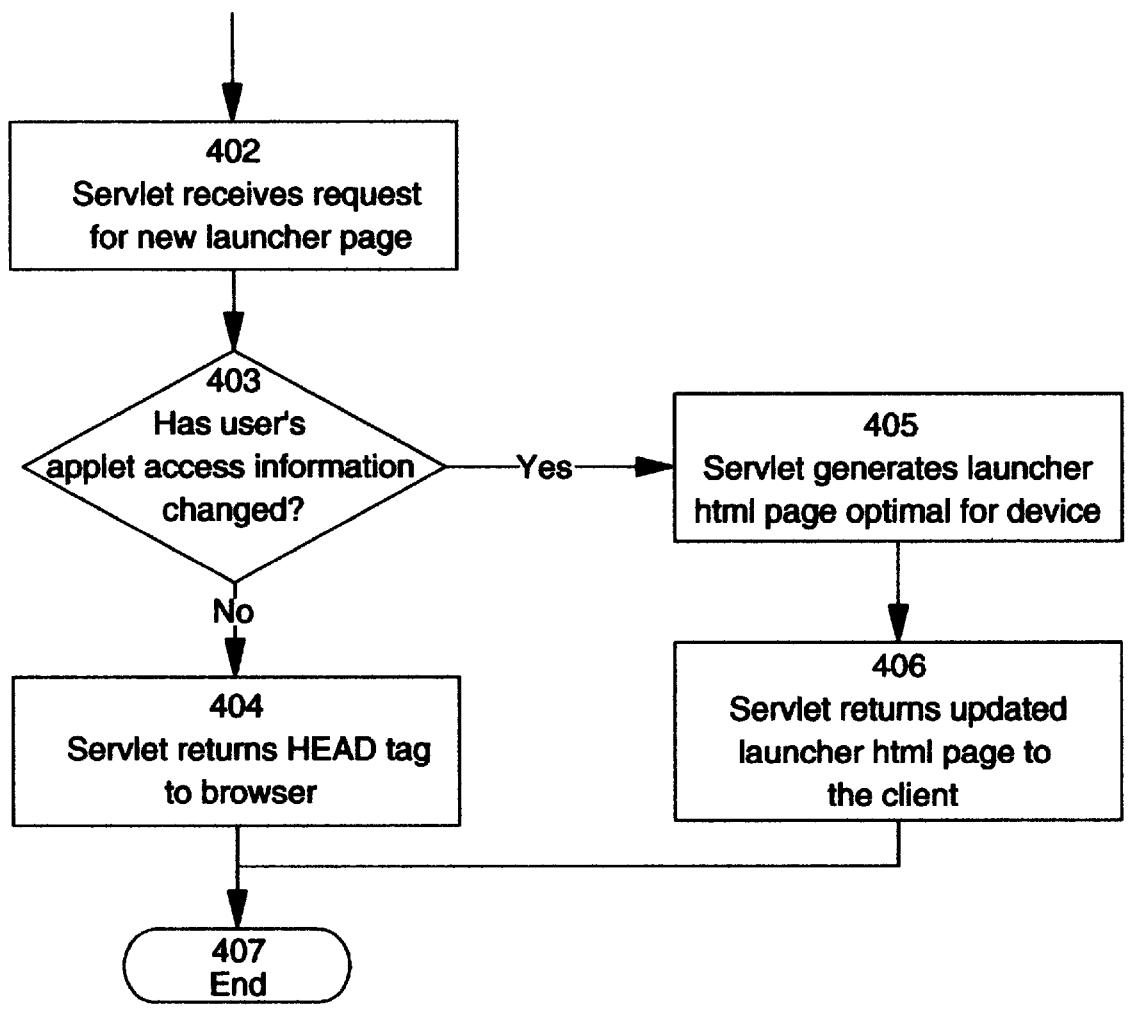
FIG. 4 is a flow chart representing the page update process of the present invention.

FIG. 4 further describes the process of resolving the optimal applet launcher page. At 401 the servlet, running on the server, receives a request for an applet launcher page. A test is made to determine whether the user's device has changed 402. If the information has not changed, a test is made to determine whether the user's applet access information has changed 403. If the information has not changed then the servlet returns an HTTP indicator depicting "no change" to the browser 404. If, at 403, the user's applet access information has changed or at 402 the device has changed, the servlet generates an applet launcher HTML page optimal for the indicated device 405 based on the screen resolution, depth of color, device type and application set. The servlet then returns the updated applet launcher HTML page to the client 406.

Figure 6:
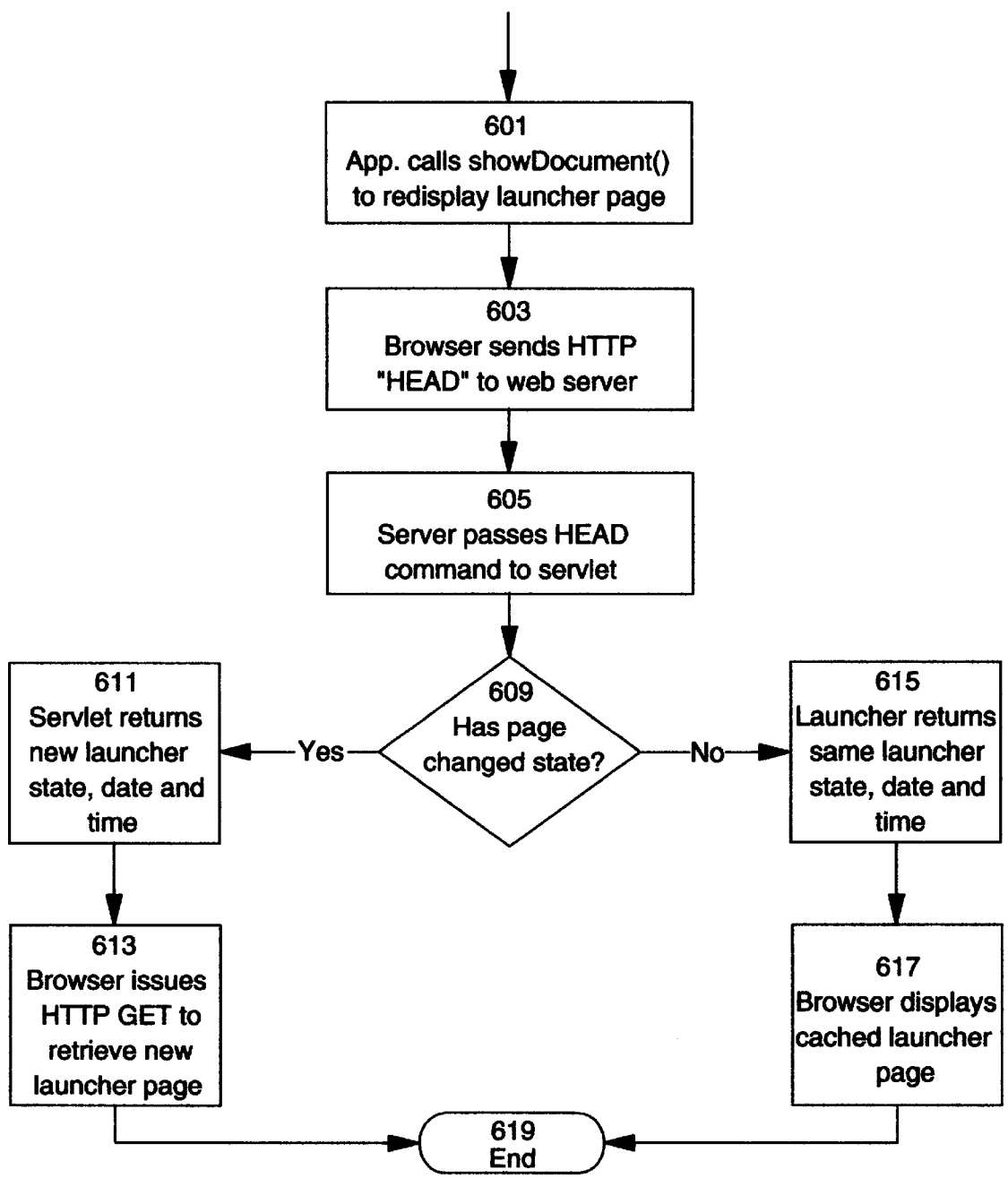
FIG. 6 is a further revision of the flow chart representing the preferred embodiment of the present invention.

FIG. 6 is a further refinement of the decision process to display a new launcher page for the preferred embodiment of the present invention. At 601 the executing application calls the showDocument( ) command to redisplay the launcher page. The browser then sends an HTTP "HEAD" request 603 to the web server indicating the metainformation for the indicated resource. The server passes the HEAD command to the servlet for processing 605. The servlet determines if the launcher page has changed state 609 from the metainformation received. If the launcher page has changed state, the servlet returns the new launcher state, date and time indications 611, then the browser issues an HTTP GET to retrieve the new launcher page 613. If the launcher page has not changed state, then the launcher returns the same launcher state, date and time indications 615. This indicates to the browser to redisplay the cached launcher page 617.

What is claimed is:

1. A system for customizing applications delivered to a client computer in a client/server network, said client computer having characteristic information, said system comprising:

a server computer;

an application suite residing on said server computer:

a web server residing on said server computer;

a web browser residing on said client computer; and, a servlet associated with said web server, said servlet receiving information indicating said client characteristics of said client computer, constructing, by said servlet, a desktop optimized for said client characteristics of said client computer and returning said optimized desktop to said web browser residing on said client computer.

2. A method for customizing applications delivered to a client computer in a client/server network, said client computer having characteristic information, said network comprising a server computer, an application suite residing on said server computer, a web server residing on said server computer and a web browser residing on said client computer, said method comprising:

means associated with said web server for receiving information indicating the client characteristics of said client computer;

means, responsive to receiving said information, for constructing a desktop optimal for said characteristics of said client computer; and, means for returning said optimal desktop to said web browser residing on said client computer.

3. A program residing on a computer readable medium for customizing applications delivered to a client computer in a client/server network, said client computer having client characteristic information, said network comprising a server computer, an application suite residing on said server computer, a web server residing on said server computer and a web browser residing on said client computer, said program comprising:

computer executable program code means associated with said web server for receiving said client characteristic information of said client computer;

computer executable program code means, responsive to receiving said client characteristic information, for constructing a desktop optimal for said characteristics of said client computer; and, computer executable program code means for returning said optimal desktop to said web browser residing on said client computer.

4. An apparatus for customizing applications delivered to a client computer in a client/server network, said client computer having characteristic information, said apparatus comprising:

computer readable program code associated with a web server, said computer readable program code associated with said web server for receiving information indicating the characteristics of said client computer, constructing a desktop optimal for said characteristics of said client computer and transmitting said optimal desktop to said client computer.

5. A system as in claim 1 wherein said client/server network has network characteristic information wherein said servlet receives information indicating said network characteristics and utilizes both said client characteristics and said network characteristics in constructing said optimized desktop.

6. A method for customizing applications delivered to a client computer in a client/server network, said client computer having client characteristic information, said network comprising a server computer, an application suite residing on said server computer, a web server residing on said server computer and a web browser residing on said client computer, said network having network characteristic information said method comprising:

means associated with said web server for receiving information indicating said client characteristic information;

means associated with said web server for receiving information indicating said network characteristic information;

means, responsive to receiving said information indicating said client characteristics and said information indicating said network characteristics, for constructing a desktop optimal for said characteristics of said client computer; and, means for returning said optimal desktop to said web browser residing on said client computer.

7. A program residing on a computer readable medium for customizing applications delivered to a client computer in a client/server network, said client computer having client characteristic information and said network having network characteristic information, said network comprising a server computer, an application suite residing on said server computer, a web server residing on said server computer and a web browser residing on said client computer, said program comprising:

computer executable program code means associated with said web server for receiving said client characteristic information of said client computer;

computer executable program code means associated with said web server for receiving said network characteristic information;

computer executable program code means, responsive to receiving said client characteristic information and said network characteristic information, for constructing a desktop optimal for said characteristics of said client computer and said network; and, computer executable program code means for returning said optimal desktop to said web browser residing on said client computer.

* * * * *